United States Patent
Prokisch et al.

(10) Patent No.: US 10,848,861 B2
(45) Date of Patent: Nov. 24, 2020

(54) LOUDSPEAKER ASSEMBLY FOR A VEHICLE

(71) Applicant: Harman Becker Automotive Systems GmbH, Karlsbad (DE)

(72) Inventors: Joerg Prokisch, Schwarzach (DE); Michael Schuster, Munich (DE); Andreas Pfeffer, Wenzenbach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 16/385,509

(22) Filed: Apr. 16, 2019

(65) Prior Publication Data

US 2020/0336825 A1    Oct. 22, 2020

(51) Int. Cl.
| | |
|---|---|
| *H04R 1/28* | (2006.01) |
| *B60R 11/02* | (2006.01) |
| *H04R 1/02* | (2006.01) |
| *B60R 11/00* | (2006.01) |

(52) U.S. Cl.
CPC ........ *H04R 1/2888* (2013.01); *B60R 11/0217* (2013.01); *H04R 1/021* (2013.01); *B60R 2011/0012* (2013.01); *H04R 2499/13* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,653,607 | A * | 3/1987 | Bage | H04R 1/025 181/141 |
| 5,218,175 | A * | 6/1993 | Scarlata | B60R 11/0217 181/141 |
| 5,629,503 | A * | 5/1997 | Thomasen | F16F 3/0873 181/199 |
| 8,139,783 | B2 * | 3/2012 | Schuster | B60R 13/0237 381/86 |
| 9,807,486 | B2 | 10/2017 | Schuster | |
| 2004/0141625 | A1 | 7/2004 | Leipold | |
| 2008/0292128 | A1 * | 11/2008 | Ishii | H04N 5/642 381/388 |
| 2013/0188806 | A1 * | 7/2013 | Tada | H04R 1/2803 381/86 |
| 2015/0030178 | A1 * | 1/2015 | Sulowski | H04R 1/345 381/86 |
| 2017/0186416 | A1 | 6/2017 | Christoph et al. | |

\* cited by examiner

*Primary Examiner* — Duc Nguyen
*Assistant Examiner* — Assad Mohammed
(74) *Attorney, Agent, or Firm* — Brooks Kushman P.C.

(57) ABSTRACT

A loudspeaker assembly for a vehicle includes an enclosure arranged to be positioned outside of a passenger compartment of the vehicle adjacent a first vehicle body panel. The enclosure has a front side, a rear side, a top portion and a substantially enclosed bottom portion, where the top portion includes an outer wall structure. A loudspeaker is mounted in the enclosure and configured to generate an acoustic signal to be radiated into the passenger compartment through an opening in a second vehicle body panel. The enclosure may include a plurality of ribs extending between the loudspeaker and the outer wall structure. A barrier may be disposed within the top portion inward of the outer wall structure and substantially surrounding the loudspeaker. The ribs and the barrier damp high frequencies to reduce propagation of high-frequency noise toward the passenger compartment.

20 Claims, 5 Drawing Sheets

LOUDSPEAKER ASSEMBLY FOR A VEHICLE

TECHNICAL FIELD

Embodiments relate to a loudspeaker assembly for a vehicle, such as including a subwoofer.

BACKGROUND

Automotive audio systems typically include several loudspeakers positioned in various locations within a vehicle. Low-frequency loudspeakers, also known as woofers or subwoofers, are often located in the trunk, the rear panel shelf, under the rear seats, or in other frame elements of a vehicle. With these placements, a small enclosure is situated in the chassis of the vehicle between the passenger compartment and the outside the vehicle. A hole is cut into the body-in-white to interface with the enclosure, allowing the acoustic signal to be radiated from the loudspeaker into the passenger compartment. This approach allows for a compact and weight-efficient loudspeaker arrangement without sacrificing acoustical performance. However, engine and other unwanted vehicle noise which would normally be blocked may be provided a path to penetrate into the passenger compartment.

SUMMARY

In one or more embodiments, a loudspeaker assembly for a vehicle includes an enclosure arranged to be positioned outside of a passenger compartment of the vehicle adjacent a first vehicle body panel. The enclosure has a front side, a rear side, a top portion and a substantially enclosed bottom portion, where the top portion includes an outer wall structure. A loudspeaker is mounted in the enclosure and configured to generate an acoustic signal to be radiated into the passenger compartment through an opening in a second vehicle body panel. The enclosure includes a plurality of ribs extending between the loudspeaker and the outer wall structure, wherein the ribs damp high frequencies to reduce propagation of high-frequency noise toward the passenger compartment.

In one or more embodiments, a loudspeaker assembly for a vehicle includes an enclosure arranged to be positioned outside of a passenger compartment of the vehicle adjacent a first vehicle body panel. The enclosure has a front side, a rear side, a top portion and a substantially enclosed bottom portion, where the top portion includes an outer wall structure. A loudspeaker is mounted in the enclosure and configured to generate an acoustic signal to be radiated into the passenger compartment through an opening in a second vehicle body panel. A barrier is disposed within the top portion inward of the outer wall structure and substantially surrounds the loudspeaker, wherein the barrier damps high frequencies to reduce propagation of high-frequency noise toward the passenger compartment.

In one or more embodiments, a loudspeaker assembly for a vehicle includes an enclosure arranged to be positioned outside of a passenger compartment of the vehicle adjacent a first vehicle body panel. The enclosure has a front side, a rear side, a top portion and a substantially enclosed bottom portion, where the top portion includes an outer wall structure. A subwoofer is mounted in the enclosure and configured to generate an acoustic signal to be radiated into the passenger compartment through an opening in a second vehicle body panel. A barrier is disposed within the top portion inward of the outer wall structure and substantially surrounds the subwoofer. The enclosure includes a plurality of ribs extending between the subwoofer and the outer wall structure, where the ribs and the barrier damp high frequencies to reduce propagation of high-frequency noise toward the passenger compartment.

DETAILED DESCRIPTION

Figure 1:
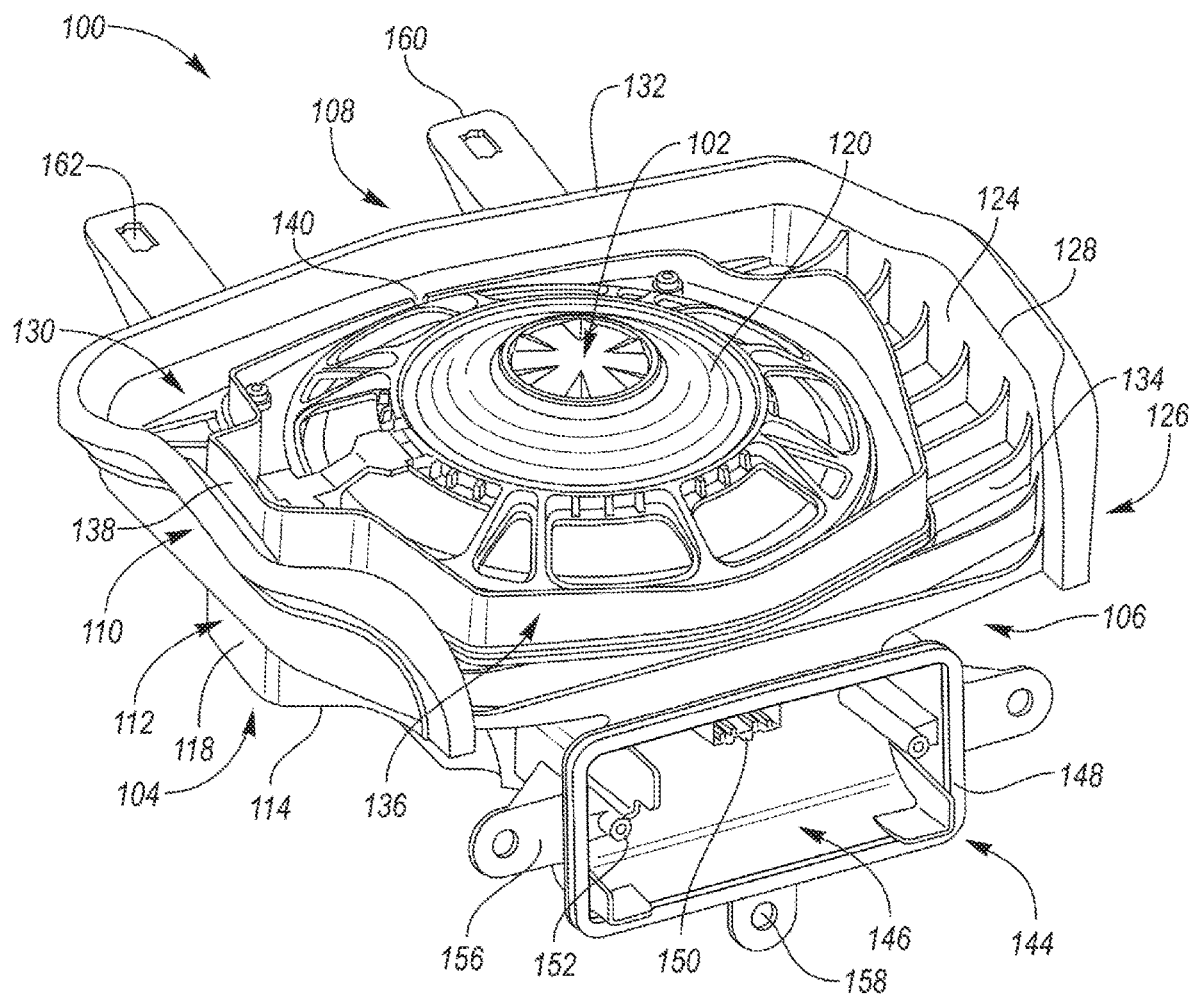
FIG. 1 is a perspective view of a loudspeaker assembly for a vehicle according to one or more embodiments.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference first to FIGS. 1-4, a loudspeaker assembly for a vehicle is illustrated and designated generally by reference numeral 100. The loudspeaker assembly 100 includes a loudspeaker 102 such as, but not limited to, a subwoofer which may be part of an automotive sound system comprising several loudspeakers. The loudspeaker 102 is disposed within an enclosure 104 which is arranged to be positioned outside of a passenger compartment of the vehicle. The enclosure 104 may be constructed from a plastic material, but the use of other materials is also contemplated.

The enclosure 104 includes a front side 106, a rear side 108, a top portion 110 and a bottom portion 112. As shown, the bottom portion 112 may be substantially enclosed and includes a bottom wall 114 and a top wall 116 joined by side walls 118. The loudspeaker 102 may be mounted in the top wall 116 in such a manner that a first side 120 of the loudspeaker 102 is disposed within the top portion 110 and a second side 122 of the loudspeaker 102 is disposed within the bottom portion 112. The top portion 110 may have a larger footprint compared with the bottom portion 112 but is not limited to this configuration. It is understood that the general proportions and shape of the enclosure 104 may be modified as necessary based on the specific dimensions of the space available within the vehicle chassis where the loudspeaker assembly 100 is to be positioned.

With continuing reference to FIGS. 1-4, the top portion 110 includes an outer wall structure 124. As shown, in one or more embodiments the outer wall structure 124 may terminate at an open front end 126 of the top portion 110.

The outer wall structure 124 further includes a top edge 128 defining an open upper end 130 of the top portion 110, where a gasket 132 may be provided on the top edge 128. The gasket 132 extends along the top edge 128 to the front end 126 of the top portion 110. In one or more embodiments, the gasket 132 may be constructed from a compressible material, such as foam, for providing a secure engagement or seal of the loudspeaker assembly 100 to a vehicle body panel as described further below.

Figure 2:
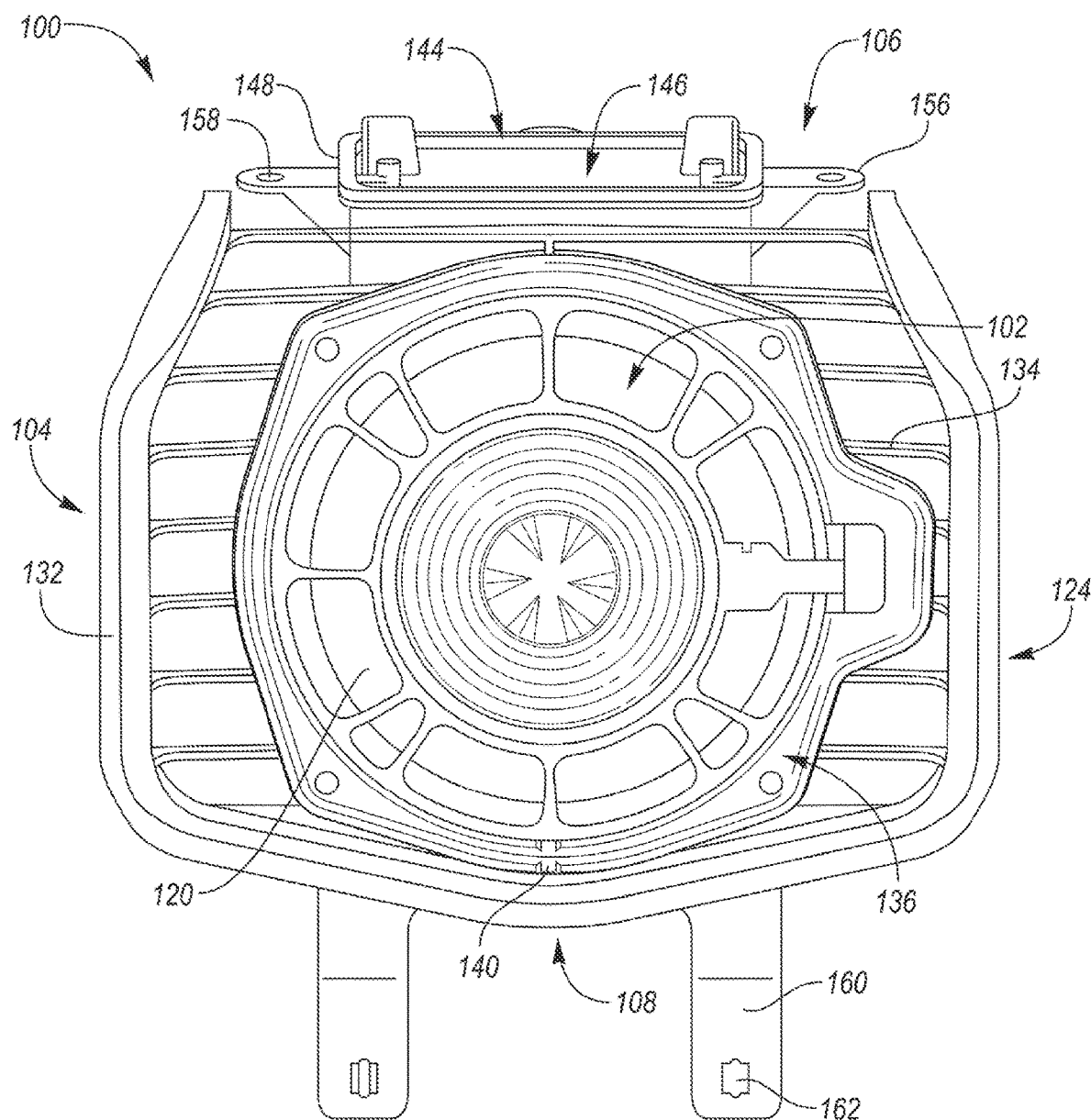
FIG. 2 is a top view of the loudspeaker assembly.
Figure 3:
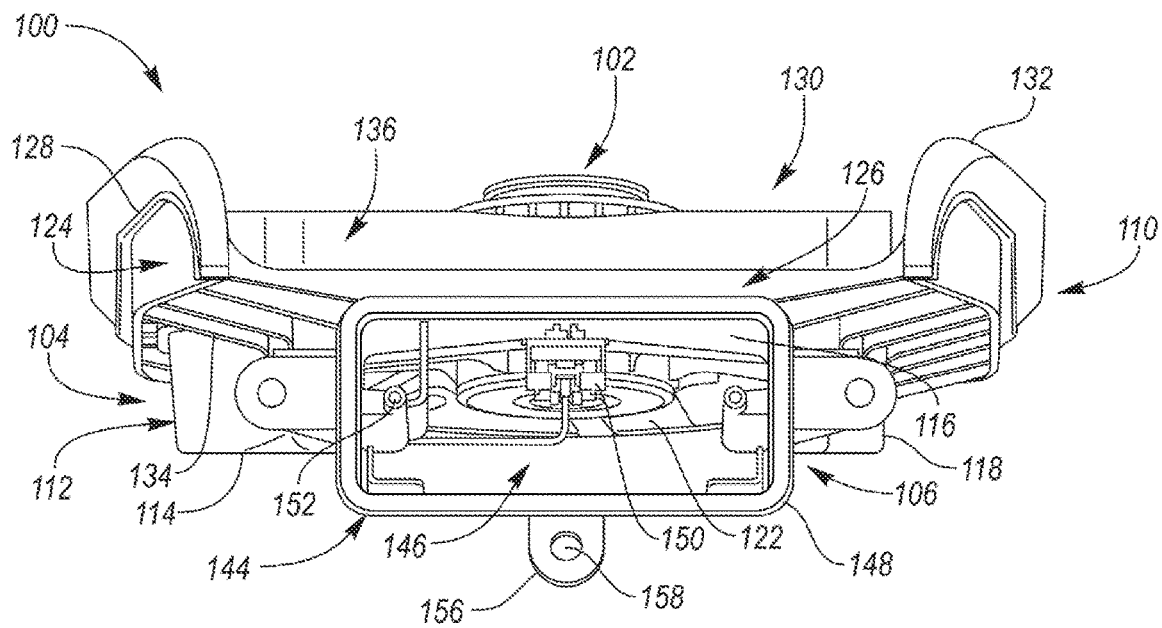
FIG. 3 is a front view of the loudspeaker assembly.
Figure 4:
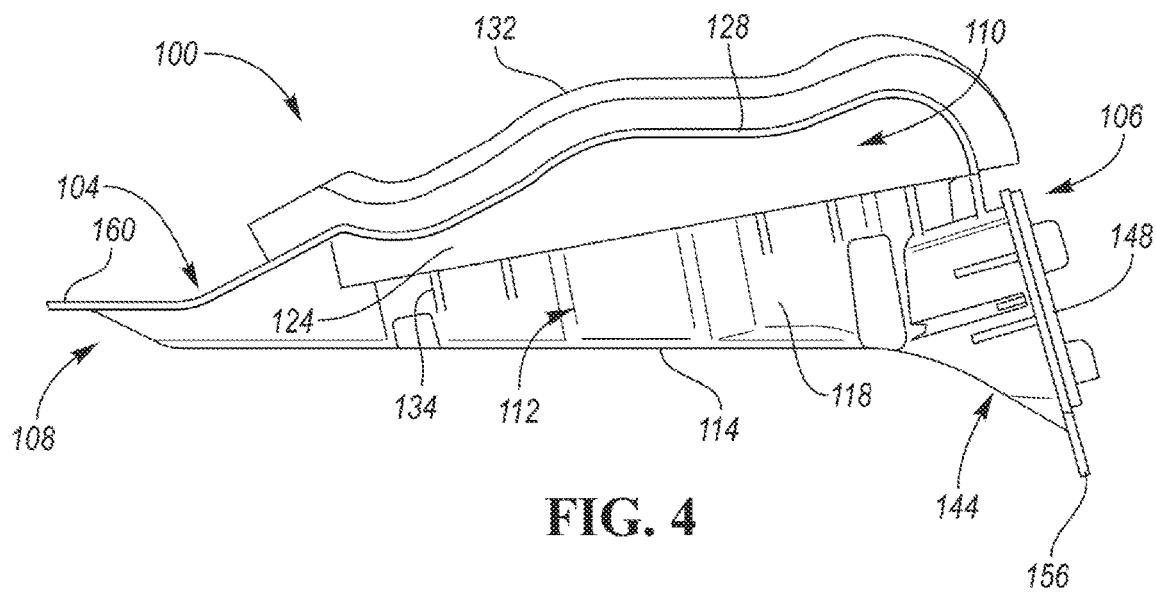
FIG. 4 is a side view of the loudspeaker assembly.

The enclosure 104 may include a plurality of ribs 134 extending between the loudspeaker 102 and the outer wall structure 124. For example, the ribs 134 may extend from the side walls 118 to the outer wall structure 124, or the ribs 134 may extend between different portions of the outer wall structure 124. As best shown in FIG. 2, in one or more embodiments the ribs 134 may be arranged generally parallel to the front and rear sides 106, 108 of the enclosure 104. As best shown in FIGS. 3 and 4, the ribs 134 may also extend below the outer wall structure 124.

The ribs 134 may reflect high-frequency noise backward toward the rear side 108 of the enclosure 104. As such, the ribs 134 may function to damp high frequencies, such as from the engine or other external sources, and therefore reduce or prevent propagation of such high-frequency noise toward and into the passenger compartment. In addition to unwanted noise, positioning of the enclosure 104 outside of the passenger compartment may result in exposure of the top portion 110 to wet conditions. The disclosed configuration of the ribs 134 in the enclosure 104 will allow any water to easily drain out of the top portion 110 so as not to interfere with the performance of the loudspeaker 102.

The ribs 134 can have any height or thickness, and the ribs 134 may have a lesser height than a height of the outer wall structure 124. The ribs 134 could have a different spacing besides that depicted herein, the spacing between the ribs 134 could be uniform or varying, and the ribs 134 may be arranged at different angles with respect to the loudspeaker 102 and the outer wall structure 124. While a plurality of ribs 134 is illustrated, it is understood that other types of air channels could alternatively be used. Furthermore, a damping material (not shown) could be disposed between some or all of the ribs 134 or within alternative air channels to provide a combined damping effect.

Referring to FIGS. 1 and 2, a barrier 136 may be disposed within the enclosure 104 inward of the outer wall structure 124 and substantially surrounding the loudspeaker 102, more specifically the first side 120 of the loudspeaker 102. As shown, the barrier 136 may include an upstanding wall generally equally spaced from a perimeter of the loudspeaker 102, and may be formed from a plastic material, although other suitable materials could alternatively be used. The barrier 136 may have a lesser height compared with the height of the outer wall structure 124, and an upper edge 138 of the barrier 136 may have a contour similar to a contour of the top edge 128 of the outer wall structure 124. Of course, the height and shape of the barrier 136 depicted herein are not intended to be limiting, and variations in the configuration of the barrier 136 are fully contemplated.

Figure 5:
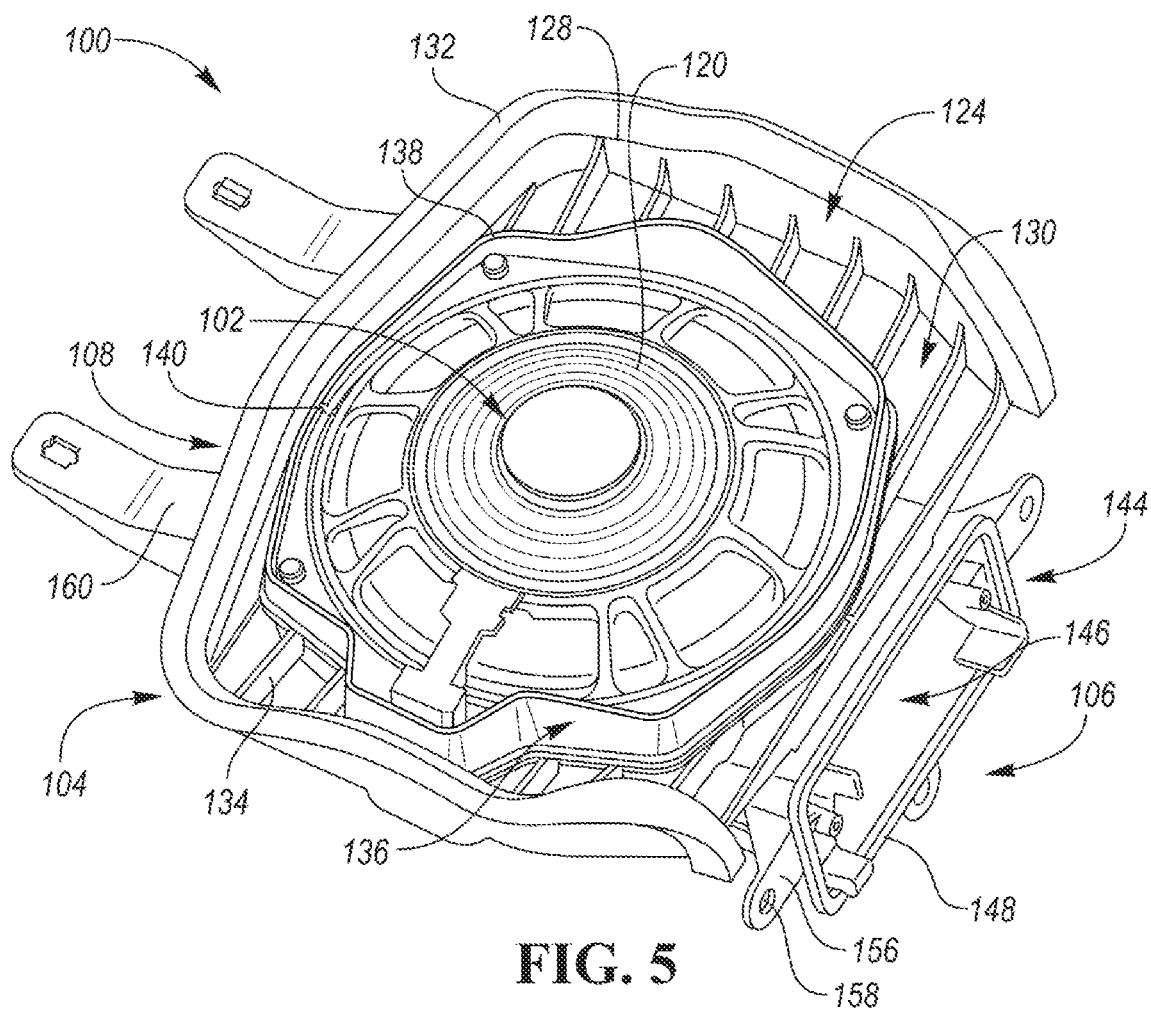
FIG. 5 is a perspective view of the loudspeaker assembly, where the arrows indicate the path of air flow from the loudspeaker.

As with the ribs 134 described above, the barrier 136 damps high frequencies to reduce propagation of high frequency noise toward the passenger compartment. With reference to FIG. 5, air flow of the working loudspeaker 102, such as a subwoofer, when the open upper end 130 is mounted against a vehicle body panel is illustrated schematically with arrows. Use of the barrier 136 increases the air load for the loudspeaker 102, providing lower frequency resonance and improving bass performance.

Figure 6:
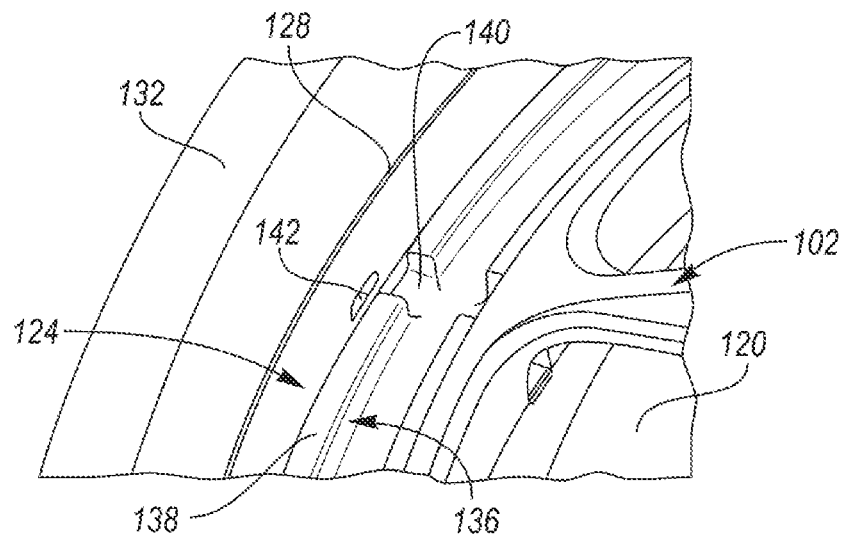
FIG. 6 is an enlarged view of a rear side of the loudspeaker assembly illustrating a drainage notch.

As described above, the positioning of the enclosure 104 outside of the passenger compartment may expose the top portion 110 to water. In order to prevent water from collecting within the barrier 136, a notch 140 may be provided in the barrier 136, such as adjacent the rear side 108 of the enclosure 104 as shown in FIG. 1 and in the enlarged view of FIG. 6. Any water present within the barrier 136 may drain out via the notch 140 and may continue draining from the enclosure 104 through a corresponding aperture 142 provided in the outer wall structure 124. Positioning of the notch 140 at the rear side 108 may allow for assistance from gravity to drain any water from the barrier 136 due to the installed orientation of the loudspeaker assembly 100 (see, for example, FIG. 8).

Returning to FIGS. 1-4, the bottom portion 112 of the enclosure 104 includes a port 144 extending from the front side 106 of the enclosure 104, where the port 144 includes an open end 146. The open end 146 is arranged to be coupled to an opening in a vehicle body panel, as described further below, for providing a passageway for sound from the loudspeaker 102 into the passenger compartment of the vehicle. The open end 146 is illustrated herein as being rectangular but is not limited to this shape. A sealing gasket 148 may be provided at the open end 146, wherein the sealing gasket 148 may be constructed from a compressible material, such as foam, for providing a secure engagement or seal of the port 144 to the vehicle body panel.

As best shown in FIG. 3, an electrical connector 150 in communication with the loudspeaker 102 may be provided which is accessible via the port 144, wherein the electrical connector 150 may be used to provide power to the loudspeaker 102 and to connect the loudspeaker 102 to an automotive sound system with one or more additional loudspeakers. Bosses 152 for receiving fasteners (not shown) to secure a grille 154 (FIG. 8) to the port 144 may be inset from the open end 146. The port 144 may have at least one tab 156 extending therefrom adjacent to the open end 146, where the tab 156 has an aperture 158 for receiving a fastener (not shown) to attach the port 144 to the vehicle body panel. Likewise, as illustrated in FIGS. 1 and 2, the enclosure 104 may include at least one tab 160 extending from the rear side 108 thereof, the tab 160 having at least one aperture 162 for receiving a fastener (not shown) to attach the loudspeaker assembly 100 to the vehicle body panel.

Figure 7:
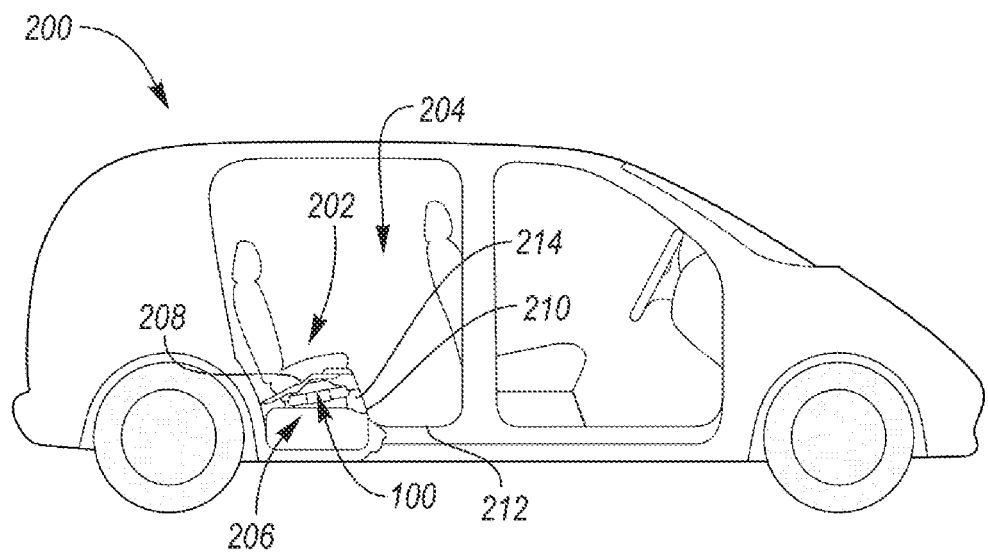
FIG. 7 is a schematic illustration of an exemplary position of the loudspeaker assembly within a vehicle.
Figure 8:
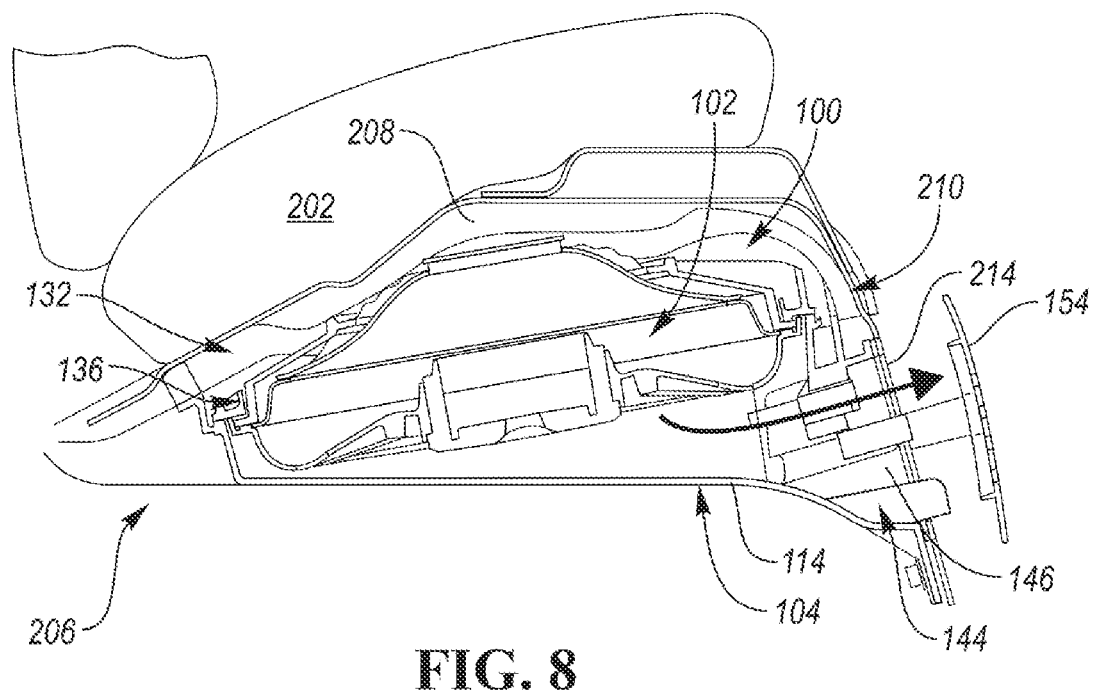
FIG. 8 is a cross-sectional view of the loudspeaker assembly positioned under a rear vehicle seat.

FIGS. 7 and 8 illustrate an exemplary position of the loudspeaker assembly 100 within a vehicle 200. As schematically illustrated, in one or more embodiments the loudspeaker assembly 100 can be positioned under a rear vehicle seat 202 in order to transmit sound into the passenger compartment 204. In an electric vehicle, this placement may be adjacent the fuel tank and battery box 206. While installation in an electric vehicle is disclosed by example herein, it is understood that the loudspeaker assembly 100 is not limited to use with electric vehicles.

The loudspeaker assembly 100 is arranged to be positioned adjacent a first vehicle body panel such as, but not limited to, a support panel 208 for the rear vehicle seat 202. The loudspeaker assembly 100 is also arranged to interface with a second vehicle body panel such as, but not limited to, a sill 210 extending upwardly from a floor panel 212 adjacent the rear vehicle seat 202. In particular, as described above with reference to FIGS. 1-4, the gasket 132 provided along the top edge 128 of the outer wall structure 124 may be compressed against the support panel 208 to securely engage and position the loudspeaker assembly 100 against the support panel 208. This engagement also allows the support panel 208 to act as a cover for the open upper end 130 of the enclosure 104. The gasket 132 may also extend to the front end 126 of the top portion 110 and thus may also engage the sill 210.

When mounting the loudspeaker assembly 100 under the rear vehicle seat 202, the port 144 is aligned and coupled with an opening 214 formed in the sill 210. The loudspeaker 102 is configured to generate an acoustic signal to be radiated into the passenger compartment 204 through the opening 214. With reference to FIG. 8, the loudspeaker assembly 100 may further include a layer of vibration damping material (not shown) positioned beneath the bottom wall 114 of the bottom portion 112, for example, to vibrationally isolate the loudspeaker assembly 100 from the vehicle panels and components and further improve the quality of the sound transmitted from the loudspeaker 102 into the passenger compartment 204.

The loudspeaker assembly 100 is described herein with respect to installation under the rear seat 202 of the vehicle 200. However, the loudspeaker assembly 100 is not intended to be limited to this location, as use of the loudspeaker assembly 100 in other vehicle body locations such as, but not limited to, a seat cross-beam or an interior panel such as an interior door panel or a trim panel may also be possible.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly for a vehicle, comprising:
an enclosure arranged to be positioned outside of a passenger compartment of the vehicle adjacent a first vehicle body panel, the enclosure having a front side, a rear side, a top portion and a substantially enclosed bottom portion, the top portion including an outer wall structure;
a loudspeaker mounted in the enclosure and configured to generate an acoustic signal to be radiated into the passenger compartment through an opening in a second vehicle body panel; and
a barrier disposed within the top portion spaced inward from the outer wall structure and substantially surrounding the loudspeaker;
wherein the enclosure includes a plurality of ribs extending between the loudspeaker and the outer wall structure, wherein the ribs damp high frequencies to reduce propagation of high-frequency noise toward the passenger compartment.

2. The loudspeaker assembly of claim 1, wherein the ribs are arranged generally parallel to the front and rear sides of the enclosure.

3. The loudspeaker assembly of claim 1, wherein the ribs extend below the outer wall structure.

4. The loudspeaker assembly of claim 1, wherein a first side of the loudspeaker is disposed within the top portion and a second side of the loudspeaker is disposed within the bottom portion.

5. The loudspeaker assembly of claim 1, wherein the outer wall structure terminates at an open front end of the top portion.

6. The loudspeaker assembly of claim 1, wherein the outer wall structure includes a top edge defining an open upper end of the top portion, wherein a gasket is provided along the top edge and arranged to engage the first vehicle body panel.

7. The loudspeaker assembly of claim 1, wherein the bottom portion includes a port extending from the front side of the enclosure, the port including an open end for coupling to the opening in the second vehicle body panel.

8. The loudspeaker assembly of claim 7, wherein the port includes at least one tab extending therefrom adjacent to the open end, the at least one tab having at least one aperture for receiving a fastener to attach the loudspeaker assembly to the second vehicle body panel.

9. The loudspeaker assembly of claim 1, wherein the enclosure includes at least one tab extending from the rear side thereof, the at least one tab having at least one aperture for receiving a fastener to attach the loudspeaker assembly to the first vehicle body panel.

10. The loudspeaker assembly of claim 1, wherein the first vehicle body panel includes a support panel beneath a rear vehicle seat, and the second vehicle body panel includes a sill extending upwardly from a floor panel adjacent the rear vehicle seat.

11. A loudspeaker assembly for a vehicle, comprising:
an enclosure arranged to be positioned outside of a passenger compartment of the vehicle adjacent a first vehicle body panel, the enclosure having a front side, a rear side, a top portion and a substantially enclosed bottom portion, the top portion including an outer wall structure;
a loudspeaker mounted in the enclosure and configured to generate an acoustic signal to be radiated into the passenger compartment through an opening in a second vehicle body panel; and
a barrier disposed within the top portion spaced inward from the outer wall structure and substantially surrounding the loudspeaker, wherein the barrier damps high frequencies to reduce propagation of high-frequency noise toward the passenger compartment.

12. The loudspeaker assembly of claim 11, wherein the barrier includes a notch adjacent a rear side of the enclosure.

13. The loudspeaker assembly of claim 11, wherein a first side of the loudspeaker is disposed within the top portion and a second side of the loudspeaker is disposed within the bottom portion.

14. The loudspeaker assembly of claim 11, wherein the outer wall structure terminates at an open front end of the top portion.

15. The loudspeaker assembly of claim 11, wherein the outer wall structure includes a top edge defining an open upper end of the top portion, wherein a gasket is provided along the top edge and arranged to engage the first vehicle body panel.

16. The loudspeaker assembly of claim 11, wherein the bottom portion includes a port extending from the front side of the enclosure, the port including an open end for coupling to the opening in the second vehicle body panel.

17. The loudspeaker assembly of claim 16, wherein the port includes at least one tab extending therefrom adjacent to the open end, the at least one tab having at least one aperture for receiving a fastener to attach the loudspeaker assembly to the second vehicle body panel.

18. The loudspeaker assembly of claim 11, wherein the enclosure includes at least one tab extending from the rear side thereof, the at least one tab having at least one aperture for receiving a fastener to attach the loudspeaker assembly to the first vehicle body panel.

19. The loudspeaker assembly of claim 11, wherein the first vehicle body panel includes a support panel beneath a rear vehicle seat, and the second vehicle body panel includes a sill extending upwardly from a floor panel adjacent the rear vehicle seat.

20. A loudspeaker assembly for a vehicle, comprising:
an enclosure arranged to be positioned outside of a passenger compartment of the vehicle adjacent a first vehicle body panel, the enclosure having a front side, a rear side, a top portion and a substantially enclosed bottom portion, the top portion including an outer wall structure;
a subwoofer mounted in the enclosure and configured to generate an acoustic signal to be radiated into the passenger compartment through an opening in a second vehicle body panel; and
a barrier disposed within the top portion spaced inward from the outer wall structure and substantially surrounding the subwoofer;
wherein the enclosure includes a plurality of ribs connecting the subwoofer and the outer wall structure, the ribs and the barrier damping high frequencies to reduce propagation of high-frequency noise toward the passenger compartment.

* * * * *